(12) United States Patent
Shor et al.

(10) Patent No.: US 9,112,544 B2
(45) Date of Patent: Aug. 18, 2015

(54) PROCESSING DATA FLOWS OVER A SINGLE COMMON PUBLIC RADIO INTERFACE

(71) Applicant: FREESCALE SEMICONDUCTOR, INC., Austin, TX (US)

(72) Inventors: Roy Shor, Tel Aviv (IL); Odi Dahan, Oranit (IL); Ori Goren, Kibutz Ruchama (IL); Avraham Horn, Givath Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 39 days.

(21) Appl. No.: 14/091,430

(22) Filed: Nov. 27, 2013

(65) Prior Publication Data

US 2015/0146612 A1 May 28, 2015

(51) Int. Cl.
*H04B 1/00* (2006.01)
*H04L 27/26* (2006.01)
(52) U.S. Cl.
CPC .......... *H04B 1/0057* (2013.01); *H04L 27/2628* (2013.01); *H04L 27/2634* (2013.01)
(58) Field of Classification Search
None
See application file for complete search history.

(56) References Cited

U.S. PATENT DOCUMENTS 5,965,819 A * 10/1999 Piety et al. ................ 73/660
2005/0105534 A1 * 5/2005 Osterling ............... 370/395.43
2007/0253465 A1 * 11/2007 Muharemovic et al. ...... 375/130
2009/0245422 A1 * 10/2009 Sampath et al. ............. 375/302
2010/0182899 A1 7/2010 Leviant et al.

OTHER PUBLICATIONS

Freescale Semiconductor, Inc., "MSC8157 Reference Manual: Broadband Wireless Access Six Core DSP," Rev. 2, Jan. 2012, 42 pages.
Texas Instruments, "Data Manual: TMS320C6670 Multicore Fixed and Floating-Point System-on-Chip", Literature No. SPRS689D; Mar. 2012; 226 pages.
EP Application 13150356.7 filed in Europe on Jan. 7, 2013.

* cited by examiner

*Primary Examiner* — Ian N Moore
*Assistant Examiner* — Hien Nguyen

(57) ABSTRACT

The method and system supports multiple bandwidth traffic over a single CPRI (common public radio interface) link (109) using a single bandwidth DMA (direct memory access) engine (505) and fast Fourier transform/inverse fast Fourier transform processing. (402, 404) The invention exploits fast Fourier transform/inverse fast Fourier transform properties and is particularly suitable for supporting LTE (Long Term Evolution) cellular communication systems (100) The CPRI Media Access Control is configured in each CPRI lane to run at the maximum bandwidth among the bandwidths required. In the uplink, lower bandwidth data samples are padded with zeros and flexible positioning may be used to arrange the data in a CPRI frame. In the downlink, the radio equipment receiver (106) only processes the relevant data and ignores any interpolated samples. The invention is compatible with CPRI and LTE standards.

11 Claims, 4 Drawing Sheets

PROCESSING DATA FLOWS OVER A SINGLE COMMON PUBLIC RADIO INTERFACE

FIELD OF THE INVENTION

This invention relates to a method and system for processing data flows and particularly, though not exclusively, to such a method and system for processing flow of data in cellular communications networks.

BACKGROUND OF THE INVENTION

In a typical cellular communications system, wireless user equipment units (UEs), for example, mobile phones or other types of mobile terminals, communicate via a radio access network with one or more core networks. A radio access network covers a geographical area which is divided into cells, with each cell area being served by a radio base station. Several base stations are connected, typically via land lines, to a control node known as a radio network controller (RNC). Such a control node supervises and coordinates various activities of the several radio base stations which are connected to it. The radio network controllers are typically connected to one or more core networks. One example of a radio access network is the Universal Mobile Telecommunications (UMTS) Terrestrial Radio Access Network (UTRAN). The UMTS is a third generation (3G) system and UTRAN is essentially a radio access network providing wideband code division multiple access (WCDMA) to user equipment units. Fourth generation systems are evolving towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network. The 3GPP LTE standard aims to improve the Universal Mobile Telecommunications System (UMTS) terrestrial radio access mobile phone standard to cope with future requirements. The 3GPP LTE technical specification is described in a set of reference documents including LTE; Evolved Universal Terrestrial Radio Access (E-UTRA) and Evolved Universal Terrestrial Radio Access Network (E-UTRAN); Overall description; Stage 2; 3GPP TS 36.300 version 9.3.0 Release 9 (2010 April). In 3GPP LTE (E-UTR A and E-UTRAN) terminology, a radio base station is called an "eNode-B" (eNB) and a mobile terminal or device is called a "user equipment" (UE).

In many radio access networks the radio base station is a concentrated node with most of its components being located at a concentrated site. However, a radio base station can also be configured with a more distributed architecture. For example, a distributed radio base station can take the form of one or more radio equipment (RE) portions that are linked to a radio equipment control (REC) portion over an internal interface. One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 4.1 (18 Feb. 2009) and in Version 5.0 (Sep. 21, 2011).

The Common Public Radio Interface (CPRI) is an industry co-operation aimed at defining a publicly available specification for the key internal interface of radio base stations between radio equipment control (REC) and radio equipment (RE), thereby allowing base station manufacturers to share a common protocol and more easily adapt platforms from one customer to another. In essence, a radio base station is decomposed into two separate blocks, known as REC and RE. The REC provides access to a UMTS network, for example, via the Iub interface, whereas the RE serves as the air interface to user equipment, known as Uu in a UMTS network. The REC generally comprises the radio functions of the digital baseband domain, whereas the RE contains analogue radio frequency functions. This functional split between the REC and RE allows the RE to be positioned close to an associated antenna. This reduces the distance which the associated signals have to travel before they are received by the RE, thereby negating the need for tower-mounted amplifiers and antenna system controllers. The link between the RE and REC is generally optical, allowing the link length to be much greater when compared with wired coaxial systems. Therefore, the distance between the RE and RRC can be around 10 Km, thereby increasing the flexibility of deployment of RE's within the network when utilising CPRI.

An REC is generally configured to comprise the radio functions of the digital baseband domain. In order to support LTE for example, in the downlink (that is from the REC to the RE), the REC must provide such functions as modulation, channel coding and interleaving, inverse Fourier transform processing and frame and slot generation. In the uplink (that is from the RE to the REC), the REC must provide such functions as Fourier transform processing, demodulation, channel decoding and the interleaving and signal distribution. An RE is generally configured to comprise analog and radio frequency functions. In order to support LTE for example, the RE, in the downlink, performs operations such as digital to analog conversion, up conversion and carrier multiplexing. In the uplink the RE performs operations such as down conversion, carrier demultiplexing and analogue to digital conversion. Many of the functions which an REC has to perform may be realised by a proprietary digital signal processing device. Two examples of DSP devices which support the CPRI are the Freescale Semiconductor B4860 and the Freescale MSC 8157 Broadband Wireless, Access Six Core DSP which is described in Freescale Semiconductor Data Sheet MSC8157E, November/2011. Typically, such devices employ a Direct Memory Access (DMA) operation to transfer data received over the CPRI link to system memory and also to fetch data from system memory for transmission over the CPRI link to the RE.

The functional split between the REC and RE is done in such a way that a generic interface, CPRI, based on In-Phase and Quadrature (IQ) data can be defined. Several IQ data flows can be sent over one physical link with each data flow reflecting the data of one antenna for one carrier, the so-called antenna carrier "AxC." Several AxC's having the same sampling rate may be aggregated into an "AxC Group." IQ data samples of different antennas along with control data are multiplexed onto a transmission line. The CPRI has a basic frame structure for carrying a control word and an IQ data block. An "AxC container" is defined as sub-part of the IQ data block of one basic frame.

LTE systems may support several different sampling rates (as detailed in the above-referenced 5GPP TS), notably 5 MHz, 10 MHz, 15 MHz and 20 MHz. Hence, in order to meet LTE requirements, a CPRI link must be able to support a multi-bandwidth connection between REC and RE. A known method of supporting two different sampling rates over the CPRI link requires the use of a dual bandwidth DMA process (employing two channels, one for each sampling rate). Typically, for a 5 MHz AxC there are two IQ samples each basic frame and for a 10 MHz AxC there are four IQ samples each basic frame. Typically, the data samples are arranged using packed positioning, for example, a basic frame may have the form IQ0_0, IQ1_0, IQ1_1, 0, . . . 0. Two Fast Fourier transform (FFT) processors for the uplink (and two inverse Fast Fourier transform (iFFT) processors for the downlink) are required, one for each sampling rate. Each FFT/iFFT processor acts on a different number of samples, a smaller number for the lower sampling rate and a greater number for the higher sampling rate. Dual and multiple DMA processes tend to increase system complexity and cost.

SUMMARY OF THE INVENTION

The present invention provides a system and method for processing data flows as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
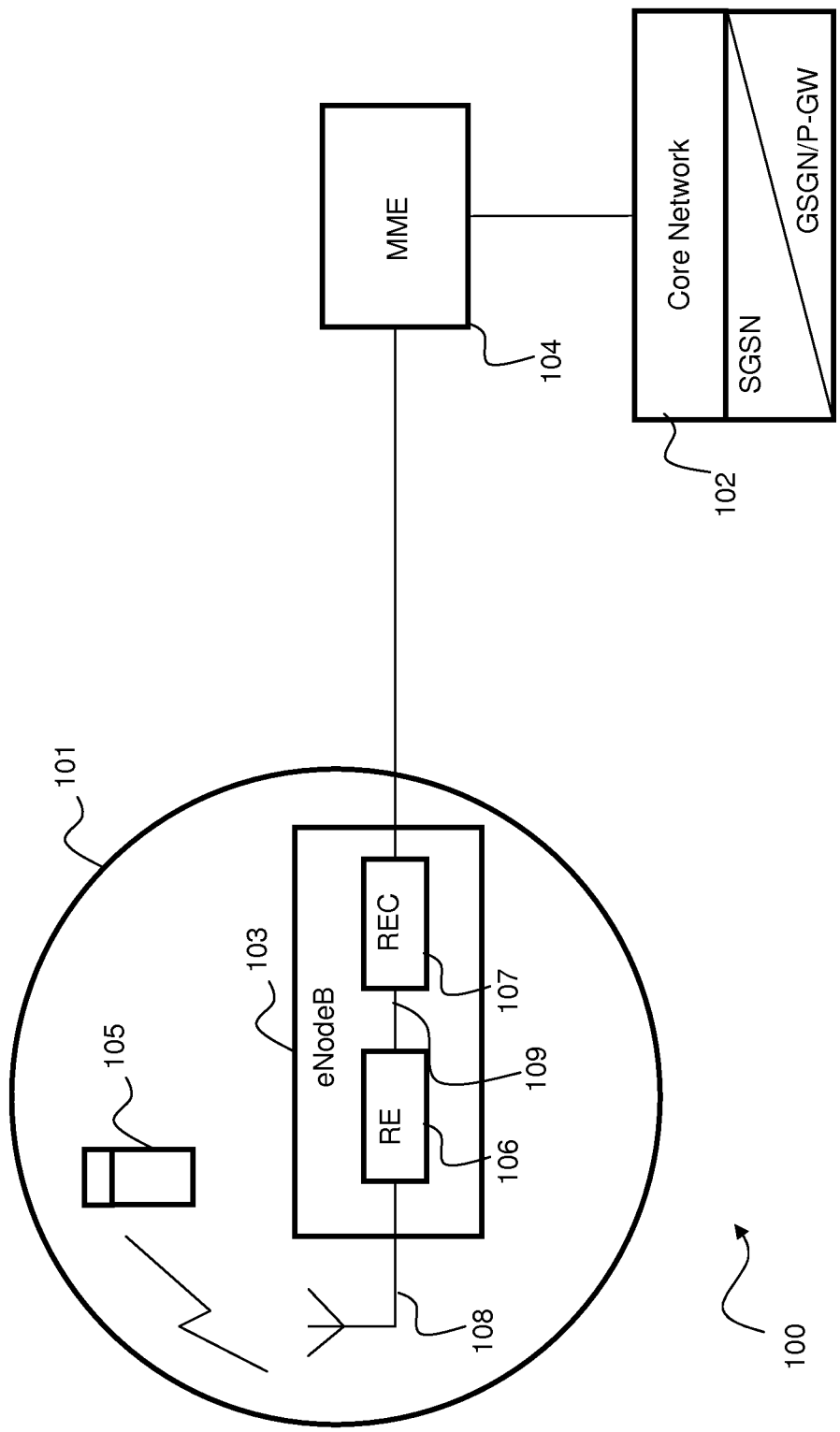
FIG. 1 is a simplified schematic diagram of a wireless communication system including an example of a system for processing data flows.

Referring now to FIG. 1, an example of part of an E-UTRAN wireless communication system including an example of a system for processing data flows is illustrated and indicated generally at 100 and comprises an LTE macro cell whose coverage area is indicated at 101. A core network 102 of the E-UTRAN wireless communications system of FIG. 1 includes a Gateway General Packet Radio System (GPRS) Support Node (GGSN) and a Serving GPRS Support Node (SGSN). The GGSN or SGSN is responsible for interfacing the E-UTRAN wireless communication system 100 with a packet data network, for example a Public Switched Data Network (PSDN), (such as the internet) or a Public Switched Telephone Network (PSTN). The SSGN performs a routing and tunnelling function for traffic to and from the macrocell 101 while the GGSN links with external packet networks. In an Evolved Packet Core, the equivalent node to a GSGN is a Packet Gateway (P-GW) and in FIG. 1 they are shown combined. In this example, the LTE macrocell 102 is served by an eNode B 103. The eNode B 103 is linked to the Core Network 102 through a Mobility Management Entity (MME) 104. The MME 104 handles signalling control; and mobility.

Typically, the eNode B 103 may be arranged to receive signals coming from a User Equipment 105 located in the macrocell 101 and down-convert them to digital data. Encoded signals are then brought back to baseband before being transmitted to the terrestrial network (that is the core network 102). Similarly, the eNode B 103 may be arranged to receive signals from the core network 102 and convert these for transmission over a wireless interface to a User Equipment 105 in the macrocell 101.

In this example, the eNode B 103 is a distributed radio base station and comprises a radio equipment portion (RE) 106 and a radio equipment control portion (REC) 107. The REC 107 may be linked to the MME 104 and the RE 106 may be coupled to an antenna 108 which may communicate wirelessly with a User Equipment 105 located within the macrocell's area of coverage 101.

In such a distributed eNode B, information transfer between the radio equipment control (REC) portion 107 and the radio equipment (RE) portion 106 may occur by use of a parallel control word transmitted over an internal interface, for example the co-called Common Public Radio Interface (CPRI) schematically shown as a link 109 in FIG. 1. Data communication by the REC 107 with the core network side of the eNode B 103, as well as data communication by RE 106 with the antenna side of the node B 203, may occur by serial communication.

The REC 107 and RE 106 may be physically separated. For example, the RE 106 may be close to the antenna 108 and the REC 107 may be located in a conveniently accessible site. Alternatively, both REC 107 and RE 106 may be co-located.

Figure 2:
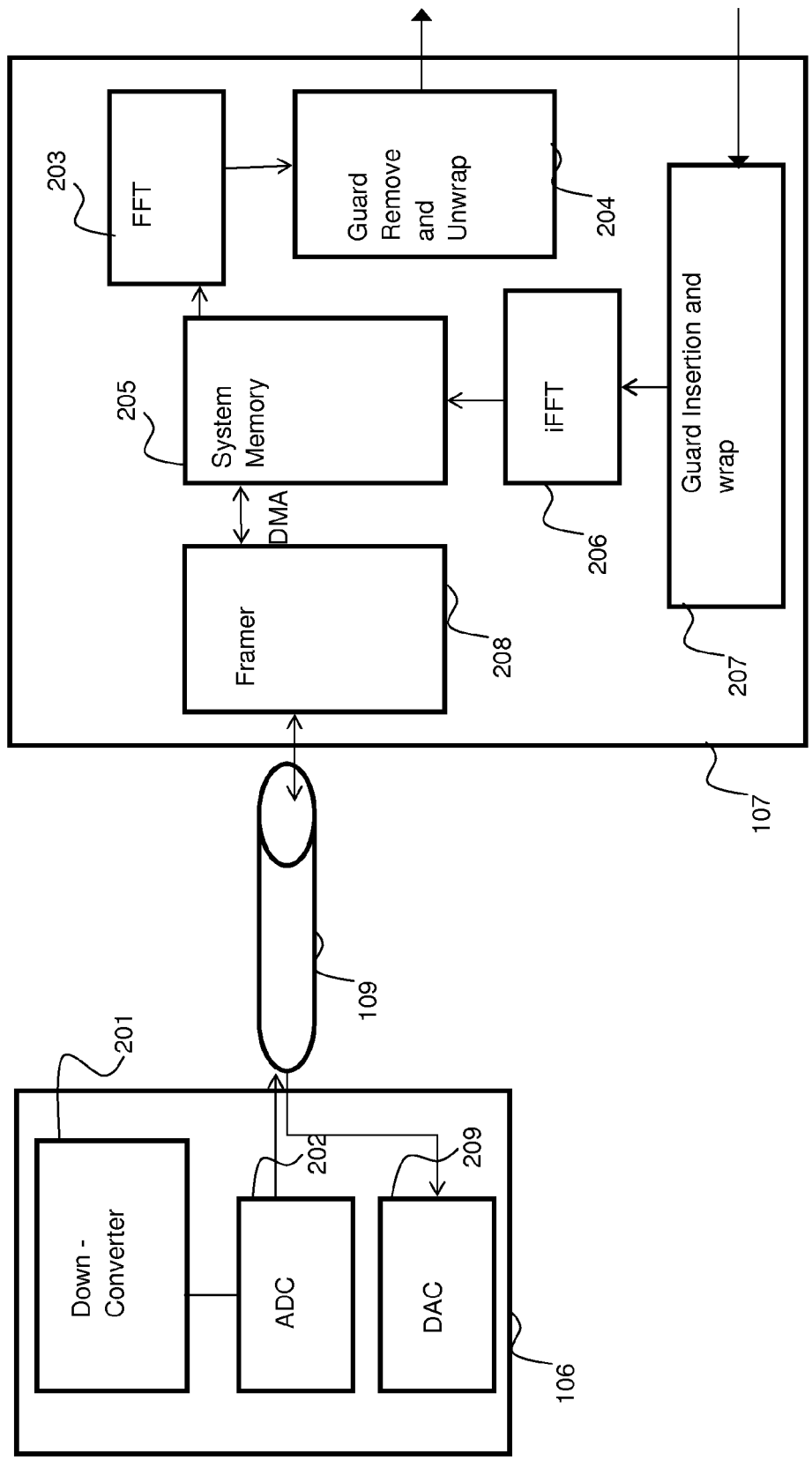
FIG. 2 is a simplified block diagram of an example of a system for processing data flows.

Reference will now be made to FIG. 2 which is an exemplary, schematic block diagram showing some of the functional, constituent components of the RE 106 and the REC 107 of FIG. 1. In the example where the wireless communication system 100 is operating in accordance with the LTE specification, the eNode B 103, which includes the RE 106 and REC 107, facilitates communications with the user equipment 105 using the known technique of OFDM modulation (orthogonal frequency division multiplexing). In OFDM, the transmission band is divided into multiple, orthogonal sub-carriers and a stream of data symbols are modulated onto the multiple subcarriers. Typically, a guard signal is generated at the beginning of each OFDM symbol (by adding a cyclic prefix) in order to eliminate any remaining inter-symbol interference caused by multipath effects. One advantage of OFDM is that equalisation is simpler than for single carrier systems. Multiple users are accommodated by employing multiple access techniques. For example, in OFDMA (orthogonal frequency division multiple access), different sub-carriers are assigned to different users. In some modes of operation of LTE systems, OFDMA is used for the link from the eNode B to the user equipment and SC-FDMA (single carrier frequency division multiple access) is used for the link from the user equipment to the eNode B. This is done to relieve constraints on transmitter design in the user equipment.

OFDM modulation utilizes the performance of an Inverse Fast Fourier Transform (IFFT) on the data to be transmitted. For demodulation, the performance of a Fast Fourier Transform (FFT) on the received signal recovers the transmitted data. In practice, the IFFT and FFT are provided by digital signal processors carrying out an Inverse Discrete Fourier Transform (IDFT) and Discrete Fourier Transform (DFT), respectively. Accordingly, the characterizing feature of OFDM modulation is that orthogonal carriers are generated for multiple bands within a transmission channel. The modulated signals are digital signals having a relatively low transmission rate and capable of staying within their respective bands. The individual carriers are not modulated directly by the digital signals. Instead, all carrier waves are modulated at once by IFFT processing.

Hence the REC 107 may be equipped with baseband processing capabilities which may be implemented in one or more digital signal processors. This processing may typically comprise modulation/demodulation, coding/decoding, and FFT/iFT operations. Baseband modulation may be Quadrature Amplitude Modulation (QAM) or Quadrature Phase Shift Key (QPSK) modulation.

In order to receive LTE signals over the air interface from a user equipment 105, the RE 106 may be provided with a down-converter 201 and an analog to digital converter (ADC) 202 which samples and digitises the baseband signals. Digital IQ data is generated by the ADC 202 and may be transmitted over the CPRI link 109 to an FFT module 203 located in the REC 107. The FFT module 203 converts the digital IQ data received from the ADC 202, (that is, the resulting baseband signal as an information symbol of the time domain), to a subcarrier signal as an information symbol of the frequency domain, according to the FFT size corresponding to the received channel bandwidth. A guard removal and unwrap module 204 may also be included in the REC 107 for performing further processing on the transformed data samples. A single bandwidth DMA function (or "engine") may also be provided in the REC 107 for transferring IQ data arriving over the CPRI link 109 into preconfigured locations in a system memory 205. Other functional modules (not shown) may be included in the REC 107 for performing additional processing of the LTE signals in accordance with conventional techniques.

For transmitting LTE signals over the air interface from the RE 106 to a user equipment 105 the REC 107 may be provided with an iFFT module 206 which converts an incoming subcarrier signal of information symbols in the frequency domain to digital IQ data samples as a time domain information symbol according to the IFFT size corresponding to the transmission channel bandwidth. A guard insertion and wrap process may be applied to the incoming samples by an additional module 207 prior to their transform in the IFFT module 206. A single bandwidth DMA engine may be used to transfer transformed IQ data samples from the system memory 205 to the CPRI link 109. A framer 208 may also be provided for positioning IQ data samples, read from the system memory 205, into a basic CPRI frame structure in accordance with CPRI specifications for transmission to the RE 106 over the CPRI link 109. The framer 208 may also be used to extract IQ data samples from the received frames (from the RE 106) which are subsequently written into system memory by way of the DMA operation. Other functional modules (not shown) may be included in the REC 107 for performing additional processing of the LTE signals (such as modulation, channel coding and interleaving) in accordance with conventional techniques. Included in the RE 106 there may be a digital to analog converter 209 for converting the digital IQ samples received over the CPRI link 109 to an analog signal.

The Common Public Radio Interface (CPRI) Interface Specification (See Version 4.1 for example) defines protocols for a physical layer (layer 1) and a data link layer (layer 2). Layer 1 defines, e.g., electrical characteristics, optical characteristics, time division multiplexing of the different data flows, and low level signaling. Layer 2 defines the MAC (media access control), flow control and data protection of the control and management information flow. Data flow over the CPRI link 109 may comprise IQ data samples of several antenna carriers (AxC) of different sampling rates and arranged in a frame structure compatible with the CPRI specification. The REC 107 of FIGS. 1 and 2 is capable of providing multi-bandwidth support using just a single bandwidth DMA process, hence minimising design effort, area and power.

An example of a system for processing data flows may be arranged to support a dual bandwidth LTE connection over a CPRI link using a single bandwidth DMA engine. In this example, the connection supports two antenna carriers (AxC) one with a sampling rate of 5 MHz and the other with a sampling rate of 10 MHz. The MAC (media access control) is configured to run at the higher, 10 MHz rate. Usually, for the 5 MHz AxC, there are two IQ samples in each CPRI basic frame and for the 10 MHz AxC, there are 4 IQ samples in each CPRI basic frame. However, in this exemplary embodiment, flexible positioning (which is supported by the framer 208 and is part of the CPRI standard) may be used when arranging the data, so that in one example, the basic frame may have the form; {IQ0_0, 0, IQ1_0, IQ1_1, 0, . . . , 0}, that is, the IQ samples may be padded with zeros. Each AxC occupies the same number of slots.

By way of a single bandwidth DMA process (using its one channel) IQ samples are put into and retrieved from the system memory 205. In the uplink (from RE 106 to REC 107), the relevant IQ data is taken from the framer and stored in the system memory 205. For the 5 MHz AxC samples, the data in memory is not packed but padded with zeros between samples. The samples may be initially arranged in this way in the RE 106. In one example, in order to achieve this, the RE may be configured to support flexible positioning. Flexible positioning is part of the CPRI standard. Further, according to the CPRI standard, padding with zeros is the default condition when no data is being sent over the CPRI link. In the downlink (from REC 107 to RE), the relevant IQ data (along with non-relevant data) is taken from the system memory 205 and put on the CPRI link via the framer 208. Of course, many samples are taken from and put onto several CPRI basic frames.

In the uplink, the FFT module 203 (which in LTE systems is the first engine which is used on the samples) will take several samples and transform them. The transformed samples are then transferred to the rest of the conventional LTE processing (not shown) after guard removal and unwrapping. In this example, two FFT engines are evoked: one for the 5 MHz samples and one for the 10 MHz samples. However, each FFT engine handles the same number of samples. Because of the FFT properties, after transformation, the relevant data is always packed (for both AxC's)

Figure 3:
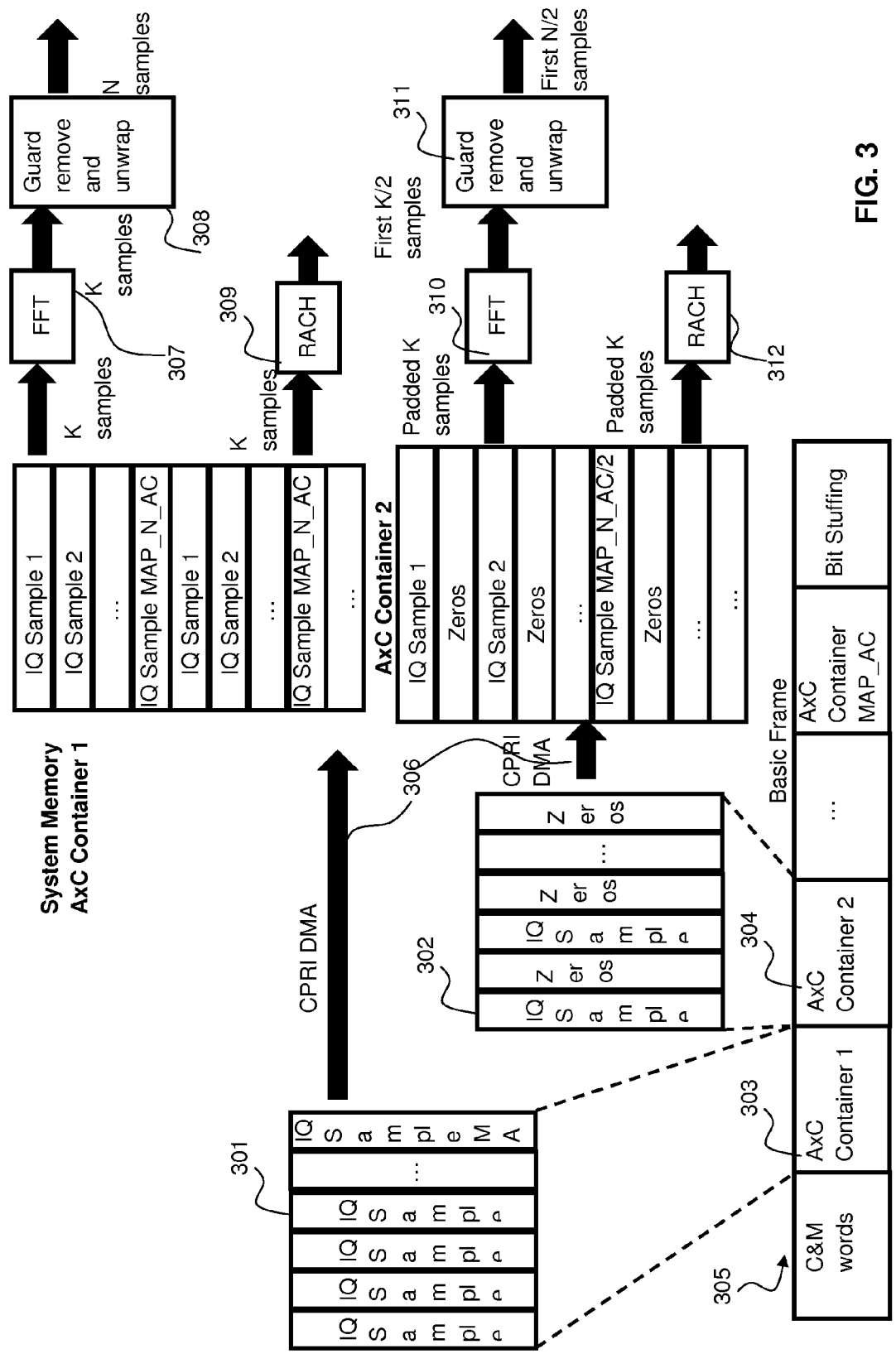
FIG. 3 is a simplified block diagram illustrating an exemplary method of processing data flows on an uplink.

In the downlink, the iFFT module 206 (which in LTE systems is the last engine which is used on the samples) will take several transformed samples, pad them with zeros (with the number of zeros equalling the number of samples) and inverse transform them. The inverse transformed samples are then transferred to the CPRI link. Again, two iFFT engines are evoked: one for the 5 MHz samples and one for the 10 MHz samples and each iFFT engine handles the same number of samples. Because of the iFFT properties, after transformation, the relevant data occupies the same amount of slots and are arranged in the same way as described above (for both AxC's). Referring now to FIG. 3 which shows an example of a method of processing data flows in the uplink, IQ data samples 301, 302 are arranged within AxC containers 303, 304 in a basic CPRI frame 305. AxC container1 303, may relate to the 10 MHz sampling rate mentioned above and AxC container2 304 may relate to the 5 MHz sampling rate example mentioned above. The IQ samples 301 associated with the 10 MHz sampling rate are arranged in their AxC container1 303 as IQ sample 1, IQ sample 2, IQ sample 3, IQ sample 4 . . . IQ sample MAP_N_AC. In contrast, the IQ samples 302 associated with the 5 MHz sampling rate are arranged with zeros interposed between each sample, that is IQ sample 1, zeros, IQ sample 2, zeros, . . . zeros. The CPRI basic frame 305 includes control and management words at its beginning and bit stuffing at its end, according to the CPRI specification. (According to the CPRI specification, a stuffing bit may be a zero). Further AxC containers may be included within the basic frame 305 (in general; AxC container MAP_AC) in accordance with the CPRI specification.

At 306, a DMA process reads the contents of the AxC containers 303, 304 into system memory. The data samples of AxC container1 303 are as follows; IQ sample 1, IQ sample 2, . . . IQ sample MAP_N_AC, IQ sample 1, IQ sample 2, etc. The data samples of AxC container2 304 are as follows; IQ sample 1, zeros, IQ sample 2, zero, . . . IQ sample MAP_N_AC/2 zeros etc.

At 307, a fast Fourier transform is performed on K samples of the higher sampling rate. At 308 a guard removal and unwrap process is performed on the K transformed samples resulting in N samples which are forwarded for further LTE processing in accordance with conventional techniques. The K samples may also undergo random access channel (RACH) processing at 309 as part of the LTE processing chain.

A batch of padded K samples of the lower sampling rate comprising K/2 samples padded with K/2 zeros are fast Fourier transformed at 310. The first K/2 samples resulting from the transform process undergo at 311 a guard removal and unwrap process which results in first N/2 transformed samples which are forwarded for further LTE processing in accordance with conventional techniques. The received samples associated with AxC container2 304 (that is the lower sampling rate of 5 MHz) are processed by the FFT engine as if they were the higher sampling rate of 10 MHz. For example, each FFT engine performs a 1024-size FFT. As the zeros are interleaved with the data in a precise manner, the first part of the FFT output will contain exactly the same data as if the FFT had been performed on the data alone, ignoring the zeros. The guard removal and unwrap process 311 is done at the "top," that is on the first k/2 samples. Conventionally, this is usually done on the data at the centre. The padded K samples may also undergo pre-processing and random access channel processing (RACH) at 312 where a pre-processing operation inputs only the odd samples to a RACH processing as part of the LTE processing chain.

Figure 4:
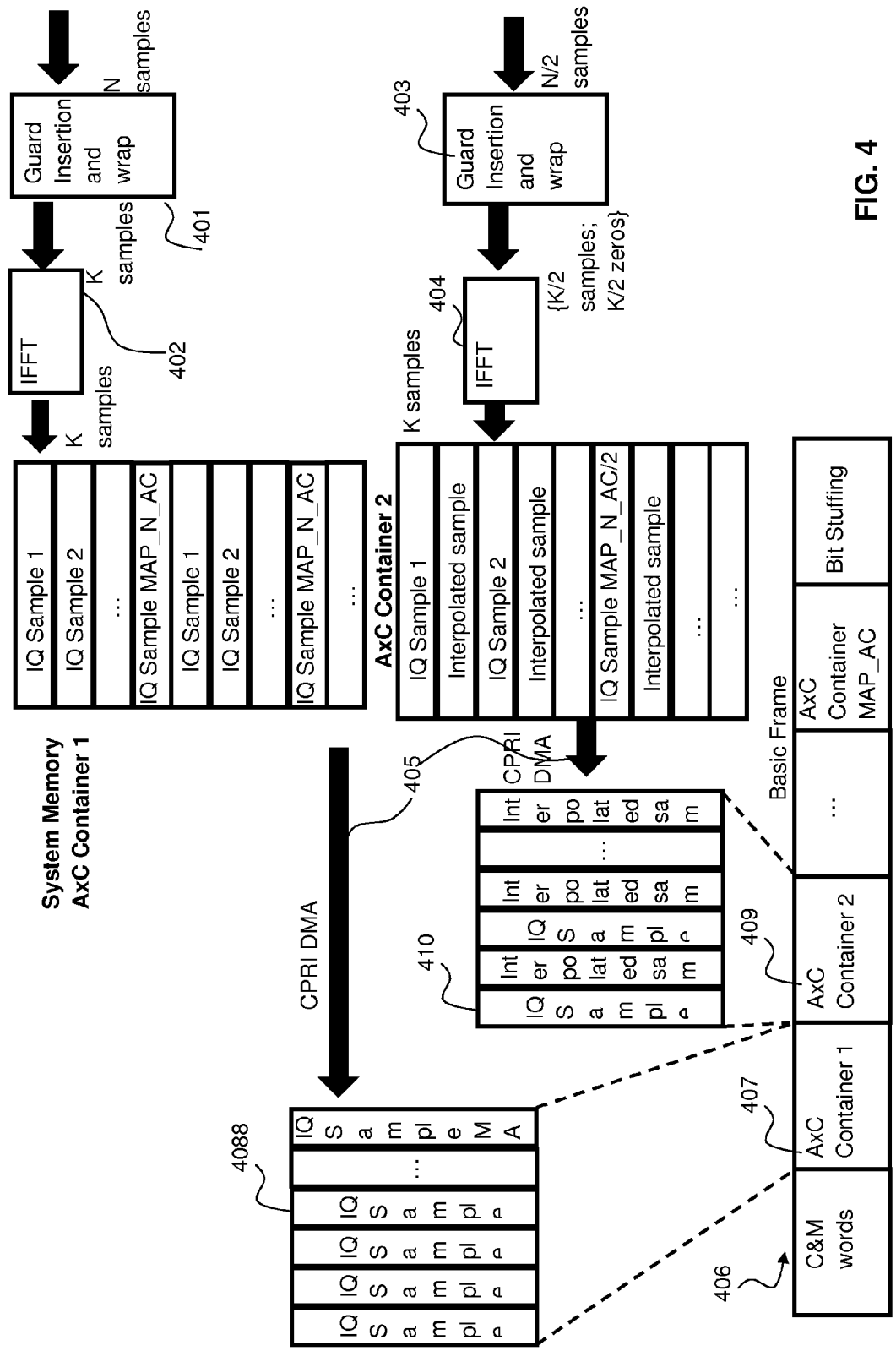
FIG. 4 is a simplified block diagram illustrating an exemplary method of processing data flows on a downlink.

Referring now to FIG. 4 which shows an example of a method of processing data flows in the downlink, N samples associated with the 10 MHz sampling rate undergo a guard insertion and wrap process at 401. This results in K samples which undergo an inverse Fast Fourier transform at 402. These K samples are transferred to system memory as follows; IQ sample 1, IQ sample 2, . . . IQ sample MAP_N_AC, IQ sample 1, IQ sample 2, . . . IQ sample MAP_N_AC . . . .

At 403, N/2 samples associated with the 5 MHz sampling rate undergo a guard insertion and wrap process. This results in K/2 samples which, after padding with K/2 zeros are operated on by an inverse fast Fourier transform process at 404. The inverse fast Fourier transform engine result is K samples consisting of K/2 samples padded with K/2 interpolated samples. These K padded samples are transferred to system memory as follows; IQ sample 1, interpolated sample, IQ sample 2, interpolated sample, . . . IQ sample MAP_N_AC/2, interpolated sample . . . . The samples associated with the lower sampling rate (of 5 MHz) are processed by the iFFT engine as if they were the higher sampling rate of 10 MHz; for example each iFFT engine performs a 1024-size iFFT. Because the zeros are fed in at the end of the data in a precise manner, the iFFT output contains exactly the same data as if the iFFT had been performed on the data alone (ignoring the interpolated data). The IFFT engine input, in the example, takes a batch of: K/2 samples followed by K/2 zeros so that that input batch length is K. For the IFFT engine output in the example, half of the samples are equal to the samples that would have been created by an IFFT engine working on the K/2 samples alone. The other half are interpolated samples that are redundant. These functions are standard properties of the FFT/iFFT transfer functions.

At 405, using a DMA engine and framer, the K samples from each IFFT operation are arranged onto a CPRI basic frame 406. AxC container1 407 contains IQ samples 408 associated with the 10 MHz sampling rate and is arranged as follows; IQ sample 1, IQ sample 2, IQ sample 3, IQ sample 4 IQ sample MAP_N_AC. AxC container2 409 contains IQ samples 410 associated with the 5 MHz sampling rate and is arranged as follows; IQ sample 1, interpolated sample, IQ sample 2, interpolated sample Interpolated sample. The RE 106 is configured (as is conventional) to take only the relevant data and ignore the interpolated part of the data in AxC container2 409 using flexible positioning. The CPRI basic frame 406 includes control and management words at its beginning and bit stuffing at its end, according to the CPRI specification. (According to the CPRI specification, a stuffing bit may be a zero). Further AxC containers may be included within the basic frame 406 (in general; AXC container MAP_AC) in accordance with the CPRI specification.

The padding with zeros operation may be done by one of several conventional methods. For example the inverse Fourier transform module may be arranged to do the padding, so that prior to performing the inverse transform operation, described above with reference to FIG. 4, the IFFT engine pads the K/2 samples with K/12 zeros. Alternatively, the guard insertion and wrap module may be arranged to do the padding. In one exemplary embodiment, an IFFT engine may read data from its memory. The IFFT engine is initially programmed so that it knows where to take data from, for example a start address. The guard and insertion module puts data samples into the IFFT's memory. Either the guard insertion and wrap module is arranged to put the data into the IFFT's memory in a particular organised way to create the batch of samples (padded with K/2 samples, see FIG. 4)) for inverse transformation, or the programming function for the IFFT does the padding. The particular organised way of arranging the data in the memory means that the zeros are always at the same slots in the memory so the processing function as zeros only at initialisation and the guard insertion and wrap operation fills and the rest Although a method and system for processing data flows has been described in the above examples in the context of dual bandwidth support those skilled in the art will understand that the principles may be extended to the case of multi-bandwith support. For example, for three sampling rates of 5 MHz, 10 MHz and 20 MHz, with a number of IQ samples per frame of 2, 4 and 8 respectively, three iFFT/FFT engines are required. Alternatively to three FFT/iFFT engines one engine working sequentially on all samples could be employed. The DMA engine is configured for 20 MHz operation. In the uplink, 20 MHz samples will not be padded. 10 MHz samples will be padded with zeros, the number of zeros being equal to the number of data points (or IQ samples per frame). 5 MHz samples will be padded with zeros, the number of zeros being 3 times the number of data points (or IQ samples per frame). So for example, the 10 MHz and 5 MHz data streams may be arranged as; IQ, zeros, IQ, zeros, . . . IQ, zeros. The FFT engines may then work on the same number of samples for all sampling rates After the FFT operations, the irrelevant data is at the end of the stream. In the downlink, 20 MHz samples will not be padded. 10 MHz samples will be padded with zeros (the number of zeros being equal to the number of data points or IQ samples per frame. 5 MHz will be padded with zeros (the number of zeros being 3 times the number of data points or IQ samples per frame). The zeros are at the end of the data stream. The iFFT engines may then work on the same number of samples for all sampling rates. After the iFFT operation, the irrelevant data (this time, interpolated data) may be arranged as follows; IQ, Interpolated sample, IQ, Interpolated sample, . . . IQ, Interpolated sample. For the 5 MHz case, for example, this may result after the iFFT operation with a data sample followed by 3 interpolated samples.

In general, the IQ samples of the lower sampling rates are padded with zeros so that after completion of the inverse Fourier transformation, the resulting data streams of all sampling rates contain the same number of samples (which equates to the number associated with the highest sampling rate).

The example embodiments described above exploit and are fully compliant with CPRI and LTE standards. For example, CPRI allows flexible positioning of the IQ data in the frame. CPRI also uses 0 as padding in the standard. LTE has FFT/iFFT operations as the interface with CPRI. FFT/iFFT transformation properties allow automatic packing/unpacking and the conventional processing allows simple guard insertion and wrap.

As an alternative to the system memory 205 of FIG. 2, the same functionality may be provided by an iFFT or FFT engine memory. Further, in place of two FFT/iFFT engines being used, one FFT/iFFT engine may be used and configured to perform two Fourier transform/inverse Fourier transform operations in sequence.

Although the methods described above relate to processes carried out within a REC, it will be understood that the same processes may also be performed in a RE or any other network element which has been provided with the appropriate functionality such as the modules comprising the REC 107 of FIG. 2

The invention may also be implemented in a computer program for running on a computer system, at least including code portions for performing steps of a method according to the invention when run on a programmable apparatus, such as a computer system or enabling a programmable apparatus to perform functions of a device or system according to the invention. As an example, a tangible computer program product may be provided having executable code stored therein to perform a method for processing data flows, the method comprising; receiving a data flow which includes N data samples of a first antenna carrier having a higher sampling rate and n data samples (where n is less than N) of another antenna carrier having a lower sampling rate than that of the first antenna, padding said n samples with z zeros (where z=N−n) to produce N padded samples, performing a first inverse Fourier transform operation on said N data samples to produce N inverse Fourier transformed samples, performing a second inverse Fourier transform operation on said N padded samples to produce N inverse Fourier transformed padded samples, transferring the N inverse Fourier transformed samples and the N inverse Fourier transformed padded samples from a memory onto a communications link for onward transmission by performing a single bandwidth DMA (direct memory access) operation wherein the communications link has a frame structure wherein the N inverse transformed samples are contained within a first AxC container and the N inverse transformed padded samples are contained within a second AxC container and comprise n data samples interleaved with z interpolated samples.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, various alternative logic gate arrangements known to those skilled in the art may be configured in order to perform the same functionality as the divider and multiplexer modules illustrated in the drawings Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The illustrated examples of the RE 106 and REC 107 and their constituent parts may be implemented as any number of separate integrated circuits or separate devices interconnected with each other in a suitable manner.

For example, an integrated circuit device may comprise one or more dies in a single package with electronic components provided on the dies that form the modules and which are connectable to other components outside the package through suitable connections, such as pins of the package and bondwires between the pins and the dies Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of processing data flows, the method comprising;
   receiving a data flow which includes N data samples of a first antenna carrier having a higher sampling rate and n data samples, where n is less than N, of a second antenna carrier having a lower sampling rate than that of the first antenna carrier;
   padding the n data samples with z zeros, where $z=N-n$, to produce N padded samples;
   performing, at an inverse Fourier transform module, a first inverse Fourier transform operation on said N data samples to produce N inverse Fourier transformed samples;
   performing a second inverse Fourier transform operation on said N padded samples to produce N inverse transformed padded samples;
   transferring the N inverse Fourier transformed samples and the N inverse transformed padded samples from a memory onto a communications link for onward transmission by performing a first single bandwidth DMA (direct memory access) operation;
   wherein the communications link has a frame structure and wherein the N inverse Fourier transformed samples are contained within a first AxC container and the N inverse Fourier transformed padded samples are contained within a second AxC container and comprise the n data samples interleaved with z interpolated samples.

2. The method of claim 1 wherein a guard insertion and wrap operation is performed on said N data samples and said n data samples prior to the inverse Fourier transform operations.

3. The method of claim 1 comprising:
   transferring data samples contained in the first AxC container comprising data samples of the first antenna carrier having the higher sampling rate and transferring data samples contained in the second AxC container comprising padded data samples of the second antenna carrier having the lower sampling rate from the communications link to the memory by performing a second single bandwidth DMA (direct memory access) operation; and
   performing a first Fourier transform operation on the N data samples from the first AxC container to produce N transformed samples for further processing, and performing a second Fourier transform operation on the N padded data samples from the second AxC container to produce first n samples for further processing.

4. The method of claim 3 comprising:
performing a guard removal and unwrap operation on said N samples and on said first n samples subsequent to the Fourier transform operations.

5. A system for processing data flows which include N data samples of a first antenna carrier having a higher sampling rate and n data samples, where n is less than N, of another antenna carrier having a lower sampling rate than that of the first data carrier, the system comprising:
a processing module for padding said n samples with z zeros, where z=N−n, to produce N padded samples;
an inverse Fourier transform module arranged to perform a first inverse Fourier transform operation on said N data samples to produce N inverse Fourier transform samples, and to perform a second inverse Fourier transform operation on said N padded samples to produce N inverse transformed padded samples;
a memory for storing inverse transformed data samples; and
a framer for arranging stored N inverse Fourier transformed samples and N inverse Fourier transformed padded samples in a frame structure for onward transmission over a communications link;
wherein the N inverse Fourier transformed samples are contained within a first AxC container and the N inverse Fourier transformed padded samples are contained within a second AxC container and comprise the n data samples interleaved with z interpolated samples.

6. The system of claim 5 comprising:
a guard insertion and wrap module for performing guard insertion and wrap operations on said N data samples and said n data samples prior to the first and second inverse Fourier transform operations.

7. The system of claim 5 wherein the inverse Fourier transform module is arranged to pad the n data samples with zeros.

8. The system of claim 6 wherein the guard insertion and wrap module is arranged to pad the n data samples with zeros.

9. The system of claim 5 comprising:
a Fourier transform module for performing a first Fourier transform operation on the N data samples from the first AxC container comprising data samples of the first antenna carrier having the higher sampling rate, to produce N transformed samples for further processing, and for performing a second Fourier transform operation on N padded data samples from the second AxC container comprising data samples of the second antenna carrier having the lower sampling rate to produce first n transformed samples for further processing.

10. The system of claim 7 including a guard removal and unwrap module for performing guard removal and unwrap operations on said N samples and said first n samples subsequent to the first and second Fourier transform operations.

11. The system of claim 5 wherein the system is implemented in one or more integrated circuit systems.

* * * * *